United States Patent
Kraemer et al.

(10) Patent No.: US 7,716,473 B1
(45) Date of Patent: May 11, 2010

(54) METHODS AND APPARATUS PROVIDING A REFERENCE MONITOR SIMULATOR

(75) Inventors: Jeffrey A. Kraemer, Wellesley, MA (US); Philip J. S. Gladstone, Framingham, MA (US); Alan J. Kirby, Hollis, NH (US); Mikhail Cherepov, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 1296 days.

(21) Appl. No.: 10/822,069

(22) Filed: Apr. 9, 2004

(51) Int. Cl.
*H04L 29/06* (2006.01)
*G06G 7/48* (2006.01)
*G06F 1/00* (2006.01)
*G06F 1/04* (2006.01)
*G06F 11/00* (2006.01)

(52) U.S. Cl. .................. 713/164; 713/165; 713/166; 713/167; 713/500; 713/503; 726/1; 726/26; 709/220; 703/6

(58) Field of Classification Search .............. 726/1, 726/26; 713/165–167, 500, 503; 709/220; 703/6
See application file for complete search history.

(56) References Cited

U.S. PATENT DOCUMENTS

| | | | | |
|---|---|---|---|---|
| 5,974,549 A | * | 10/1999 | Golan | 726/23 |
| 7,092,866 B2 | * | 8/2006 | Rokosz | 703/17 |
| 2002/0194495 A1 | * | 12/2002 | Gladstone et al. | 713/200 |
| 2003/0051026 A1 | * | 3/2003 | Carter et al. | 709/224 |
| 2005/0080608 A1 | * | 4/2005 | Burns et al. | 703/22 |
| 2005/0197815 A1 | * | 9/2005 | Grebenev | 703/14 |

* cited by examiner

*Primary Examiner*—Christopher A Revak
*Assistant Examiner*—Trang Doan
(74) *Attorney, Agent, or Firm*—HIckman Palermo Truong & Becker LLP

(57) ABSTRACT

A computer-implemented system, method and apparatus for operating a reference monitor simulator is operable to recreate the operations performed by a reference monitor on a computer system. In one configuration, the system defines at least one security rule specifying whether to allow or deny a request to access at least one resource under a given set of circumstances and supplies at least one request to access a resource. The system further applies the at least one security rule in response to the at least one request to access a resource to determine whether to allow or prevent the at least one request.

48 Claims, 4 Drawing Sheets

METHODS AND APPARATUS PROVIDING A REFERENCE MONITOR SIMULATOR

BACKGROUND

This invention relates to computer security, and more specifically to a simulator of a reference monitor with which computer security policy is implemented.

Conventional network security systems can be said to provide either passive or active protection from threats. Passive security systems collect data on system activity so that the activity can be analyzed, security breaches can be detected, and access policies can be adjusted over time. Examples of conventional passive security systems include activity logging tools and auditing tools, which may be employed in conjunction with one another. Activity logging tools track the activity of one or more computers and record system activity as entries in a series of log files. Auditing tools typically examine those log entries to discern breaches, attacks, or other potentially threatening activity.

Active security systems provide real-time barriers to intrusions via software- or hardware-based, pre-programmed detection and access prevention measures. Examples of active security systems include content filtering tools and access control and/or monitoring tools. Content filtering tools, such as computer virus scanners, execute on either e-mail servers or workstations, and function by examining incoming content (e.g., e-mail messages and attached files) to determine the presence of threatening matter, by comparing that content with data received in previous attacks. Some access control tools, such as network firewalls, are deployed on dedicated machines at a network perimeter to control inbound and outbound access using pre-configured permission policy. Other access control tools also perform access monitoring functions, such as regulating access to system resources. For instance, reference monitors, which execute in the kernel of a workstation or server, regulate requests that are issued by applications or processes for access to system resources. Some reference monitors are stateful (such as the stateful reference monitor described in commonly assigned U.S. patent application Ser. No. 10/071,328, which is incorporated herein by reference), and function by preventing requests that cause unwanted variations from a dynamic machine state. Other reference monitors are stateless, and function by preventing variations from predetermined system settings.

The rules defining a security system's response to specific activity (i.e., whether the activity is allowed, denied, regulated or otherwise observed) is known as a security policy. It is advantageous to periodically evaluate a security policy's effectiveness in deterring evolving security threats. Evaluating security policy can provide a better understanding of how the security system responds to various stimuli, and allows those responses to be refined if appropriate. It may also present the opportunity to compare the effectiveness of a policy (i.e., its ability to stop harmful activity while yet permitting innocuous activity) to an objective benchmark.

There are two prevalent techniques used to evaluate security policy. The first technique involves gathering a sample "trace" (i.e., log of system activity), and applying the stimuli recorded in the trace to a live or semi-live computer system to determine the computer system's response to the stimuli. A trace includes a series of records embodying requests for access to system resources issued by various applications and processes executing on the system. Examined individually, trace records reveal the access requested by a particular process to a resource. For example, a trace record may show the level of access requested by an e-mail application in a particular circumstance, such as permission to update the system registry. Examined in aggregate, trace records reveal relationships between requests, such as the types of requests that are common across applications, the period that elapses between requests, and other relationships. For example, a group of records may reveal that only certain types of applications request permission to update certain data, or attempt certain operations. As such, trace data can be extremely useful for studying a security system's response to various stimuli, so that the response can be refined, if necessary. A trace may include, for example, access requests issued during a computer virus attack on one system. When the requests in the trace are re-executed on a second system, information produced during the second system's response may reveal whether that response should be adjusted and, if so, how.

A second technique for evaluating security policy also employs trace data, but instead of executing the stimuli recorded therein on a live or semi-live computer system, the data is analyzed by a neural network or other collection of computer programs to determine whether it represents normal and/or harmful activity. For example, a neural network may be used to recognize one or more patterns of access requests within the trace, and to determine whether these patterns represent an attack or other threatening activity. For example, a neural network may be employed to recognize that a group of requests that individually seem innocuous are actually, in aggregate, an attack. This analysis may be performed to identify and catalog known harmful and/or harmless behavior so that the security policy implemented on one or more other systems can be updated accordingly.

There are at least three drawbacks to these techniques for evaluating security policy. The first is that obtaining trace data can be costly (particularly when supplied by a third party provider), and the data obtained may be flawed. For example, because third party trace data is a recording of actions monitored by and executed on another system, the execution of those actions on the originating system may have different effects than their execution on the system being tested. The second drawback is that running a simulation on a live or semi-live computer system consumes valuable computing resources by requiring the computer system to be taken offline, thereby imposing not only the cost of execution but the opportunity cost associated with suspending business functions normally performed by the offline computer. The third drawback is that because a trace may need to comprise a large body of varied stimuli to provide meaningful results, testing can be extremely time-consuming.

SUMMARY

These and other drawbacks associated with conventional approaches to evaluating security policy are addressed by the present invention.

A first embodiment is directed to a computer implemented method of operating a reference monitor simulator operable to recreate the operations performed by a reference monitor on a computer system. The method comprises: (A) defining at least one security rule specifying whether to allow or deny a request to access at least one resource under a given set of circumstances; (B) supplying at least one request to access a resource; and (C) applying the at least one security rule in response to the at least one request to access a resource to determine whether to allow or prevent the at least one request. The method may further comprise providing at least one parameter defining the system environment in which the reference monitor executes, and/or assessing the effectiveness of the at least one security rule.

A second embodiment is directed to a computer readable medium having instructions recorded thereon which, when executed by a computer, cause the computer to perform a method of operating a reference monitor simulator operable to recreate the operations performed by a reference monitor on a computer system. The method comprises: (A) defining at least one security rule specifying whether to allow or deny a request to access at least one resource under a given set of circumstances; (B) supplying at least one request to access a resource; and (C) applying the at least one security rule in response to the at least one request to access a resource to determine whether to allow or prevent the at least one request. The computer-readable medium may further comprise instructions defining providing at least one parameter defining the system environment in which the reference monitor executes, and/or instructions defining assessing the effectiveness of the at least one security rule.

A third embodiment is directed to a system for simulating the operations performed by a reference monitor. The system comprises a definer component, to define at least one security rule specifying whether to allow or deny a request to access at least one resource under a given set of circumstances; a supplier component, to supply at least one request to access a resource; and an applier component, to apply the at least one security rule in response to the at least one request to access a resource to determine whether to allow or prevent the at least one request. The system may further comprise a provider component to provide at least one parameter defining the system environment in which the reference monitor executes.

A fourth embodiment is directed to a signal embodied in a transmission medium, the signal operable to recreate the operations performed by a reference monitor on a computer system. The signal comprises a first segment including a security rule specifying whether to allow or deny a request to access a resource under a given set of circumstances, a second segment including a request to access a resource, and a third segment including instructions to apply the at least one security rule, in response to the request, to determine whether to allow or prevent the at least one request. The signal may further comprise a parameter defining the computer system environment, and/or a request to access a resource.

A fifth embodiment is directed to a method of evaluating a security rule on a computer system. The method comprises: (A) applying, by a reference monitor simulator, a security rule in response to receiving a request to access a resource, the security rule defining whether to allow or prevent the request; and (B) assessing the effectiveness of the security rule. The method may further comprise providing at least one parameter defining the system environment in which the security rule is applied.

DETAILED DESCRIPTION

Figure 1:
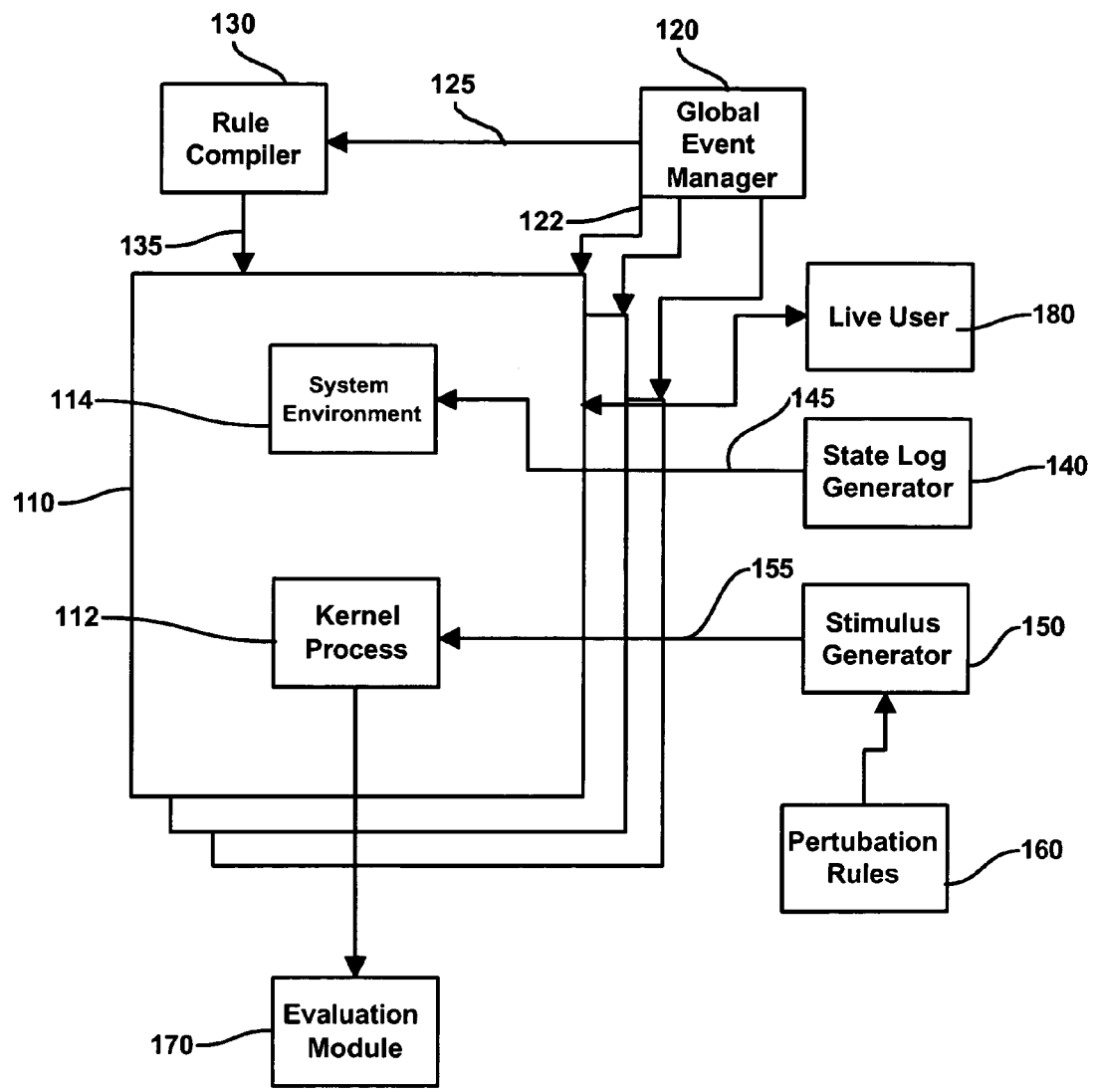
FIG. 1 illustrates an embodiment of architecture of a reference monitor simulator.

Aspects of embodiments of the present invention are directed to improving the evaluation of security policies through the simulation of a reference monitor. A simulator processes input trace records according to security "rules" which approximate a security policy. These rules specify whether the simulator should allow or deny specific types of access requests. The simulator also employs a series of parameters defining a system environment in which an actual reference monitor would execute. In one embodiment, the simulator functions as a stateful reference monitor (i.e., by processing trace requests according to rules defining permitted variations from machine state), although the invention is not limited in this respect. Trace records may be modified, by manual and/or automated means, to create stimuli designed to test the simulator's response to various circumstances. The reference monitor simulator may be executed on any suitably equipped computer system, but does not require that the computer system comprise all the hardware or network connections of a "live" system. The simulator may produce results in the form of a log of responses to requests, an evaluation of the propriety of those responses, and recommendations for security policy updates.

One embodiment comprises a computer-readable medium encoded with instructions which, when executed on a computer system, simulate the functions of a reference monitor. As discussed in further detail below, although the simulator may execute in the application space of a suitably equipped general-purpose computer system, it reproduces the functions of an actual reference monitor which typically operates in the kernel, or a series of user level or a series of user-level and kernel-level monitors interacting with the global-level monitor (120 in FIG. 1) of a computer system. To accomplish this, the simulator comprises a "kernel process" that reproduces reference monitor functionality, and a simulated system environment that replicates parameters provided by a computer system (e.g., registry data and network configuration information) during reference monitor execution. The simulator also employs security rules, provided in the form of a series of programmed instructions, to process requests. The kernel process and system environment may be configurable to define the simulator's response to particular types of requests and/or the system's support of that response. For example, if a stateful reference monitor is being simulated, permitted variations from machine state may be defined. As the simulator processes requests, it may create a record (e.g., a log file entry) describing its response to each request. Log files may be analyzed to determine the effectiveness of a particular security policy as implemented by the simulator.

Another embodiment provides a propagated signal which facilitates the evaluation of security policy by enabling the simulation of the functions of a reference monitor. Such a signal may facilitate reference monitor simulation in any of numerous ways, as the invention is not limited to a particular implementation. In one example, a signal provider may transmit (e.g., to a customer) a signal that comprises a series of programmed instructions that include a reference monitor simulator, a security policy, a simulated system environment and a process for producing a trace of system activity. The customer may then execute these programmed instructions to evaluate such a security policy as it would be implemented by a stateful or stateless reference on their system(s).

In another example, a customer may allow the provider to access its system, so that the provider can, through the propagated signal, execute a trace of activity and ascertain the specifics of the customer's system environment so that it can be replicated. The provider will then cause a signal containing this information to be transmitted back to the provider system(s) for processing, so that the provider can simulate and evaluate the use of a reference monitor as if it were implemented on the customer's system. Other implementations may represent variations on these arrangements, as the invention is not limited to a particular implementation.

Another embodiment provides a reference monitor simulator whose execution is not time-driven (i.e., temporal) but event-driven. To accomplish non-temporal execution, trace requests are provided to the simulator with an indication of the time of original execution (e.g., the requests may be time-stamped). When re-executed by the simulator, the period between the execution of requests may be eliminated or otherwise modified. Where a stateful reference monitor is being simulated and the request's execution depends on, or is affected by, the presence of a particular system state or condition, trace data may also include a log of system state indicating the time when this state was ascertained. The state log may then be cross-referenced with requests as needed, so that a request may be processed under a state that replicates the original environment. Further, trace data may be supplemented to include timer events. For example, a trace request may require that a specific period elapse after an initial portion is executed before a subsequent portion can be executed. A timer event inserted into trace data may provide the indication that such a period has elapsed, thereby alleviating the need for the period to actually elapse before the subsequent portion is processed. In this manner, the simulator's re-processing of trace requests may be driven by events rather than time, potentially making the evaluation of security policy a much less time-consuming exercise. The simulator can be used for stress-testing of the Management Console, as the simulator can provide thousands of instances concurrently. This setup benefits from scaling the intervals between request execution from zero, to real-time, to several times slower than real-time. FIG. 1 depicts an exemplary reference monitor simulator architecture. Reference monitor simulator 110 includes kernel process 112 and system environment 114, which interact to process trace requests. In particular, system environment 114 provides the parameters needed to support the execution of the trace request by kernel process 112. For example, processing a particular trace request may require that the kernel process execute a lookup to the system registry. When this occurs, kernel process 112 issues a query to system environment 114. In response, system environment 114 provides simulated registry information to kernel process 112. To support the overall processing of trace requests by kernel process 112, system environment 114 may be equipped with one or more data objects defining the environment to be simulated. A live user 180 can also issue and respond to interactive queries to and from the reference monitor simulator 110. During operation, system environment 114 may employ this information to provide such data to kernel process 112 as process identifiers for resource requests, and timer events, and perform such simulation functions as ensuring that requested data appears as expected, stubbing callouts, and maintaining the system clock. System environment 114 may also perform such setup functions as establishing the registry, network interfaces and process handlers, and resolving paths for processes and/or files referenced in trace data. In one embodiment, any of the parameters maintained by system environment 114 may be modified, either by a user or an automated process.

Global event manager 120 provides security policy to rule compiler 130 in signal 125. In one embodiment, security policy is provided in the form of a series of instructions which define how the simulator should respond to particular stimuli. Rule compiler 130 compiles these instructions into a data object, and makes the data object accessible to simulator 110 in signal 135. Rule compiler may make the data object accessible by placing it in a library so that it other applications may access the data object as well, although the invention is not limited in this regard. Further, a management console application may access and modify the data object during simulator execution in order to test security policy under various scenarios.

Global event manager 120 also communicates with simulator 110 in signals 132. In one embodiment, global event manager 120 receives input from simulator 110, and more specifically from system environment 114, in response to queries issued to system environment 114 by kernel process 112. For example, kernel process 112 may request registry data which system environment 114 does not maintain. When this occurs, system environment 114 issues a request to global event manager 120, which provides the requested information to system environment 114, in the form of an "event," in signal 132. The process through which events are received and processed is discussed in greater detail below, with reference to FIG. 2.

As can be seen from FIG. 1, global event manager 120 may communicate with multiple simulators 110. In some instances, it may be advantageous to simulate the operation of multiple reference monitors simultaneously. For instance, simulating multiple reference monitors that each reside on separate workstations in a networked environment may provide greater insight into the proliferation of viruses across such an environment. However, the invention is not limited in this regard, as any number of reference monitors may be simulated at one time.

Stimulus generator 150 transmits trace records to simulator 110, and more particularly to kernel process 112, in signal 155. The transmission of trace records may be accomplished according to any of numerous inter-process communication protocols, as the invention is not limited to a particular implementation. In one embodiment, stimulus generator 150 may transmit trace records to kernel process via Windows DDE. As discussed above, trace records include requests issued by one or more applications to access system resources, such as COM objects, files systems, system registry or other resources. In one embodiment, trace records are transmitted to kernel process 112 individually, although the invention is not limited in this regard. For example, stimulus generator 150 may transmit all trace records to kernel process 112 at once, or may transmit multiple subsets of trace records to kernel process 112 over time.

In one embodiment, stimulus generator 150 provides an unmodified, "raw" system trace to simulator 110, although the invention is not limited in this regard. For example, stimulus generator 150 may allow the modification of trace data to fabricate certain requests, events or orchestrated sequences thereof. In this manner, a user may ensure that a trace captures a certain form of activity, does not include a certain type of activity, or that the trace is otherwise modified as desired.

Stimulus generator 150 may be integrated with a management console (such as the Cisco Security Agent Management console provided by Cisco Systems, Inc.) to allow a user to edit trace requests by hand, to execute an automated process to modify trace requests, or a combination thereof. Such a management console may allow a user to audit the trace, granting insight into how applications request access to system resources, and potentially causing the user to modify the trace, security rules, or both in response.

In the embodiment depicted in FIG. 1, trace data modification is performed by perturbation rules 160, which provides input to stimulus generator 150 in signal 165. Perturbation rules 160 may be integrated with a separate management console, or may comprise a stand-alone component. Perturbation rules 160 may comprise automated commands, although the invention is not limited in this respect. For example, perturbation rules 160 may allow manual input, or may provide for a semi-automated modification process.

Perturbation rules 160 may be used to modify trace data for any of numerous reasons. In one example, trace data may be modified to determine the simulator's reaction to a specific request or to invoke a specific response. For instance, a trace record may be inserted to determine the system's response to a request to modify a particular COM object, so that the response may be modified if necessary. In another example, specific requests may be "tagged" as being particularly noteworthy, so that the system's response to it can be found easily in a log after execution. For instance, a series of trace requests, which appear to constitute innocuous activity when examined individually but which together constitute an attack, may be tagged so that the system's response to the series may subsequently be examined. In still another example, the timing of a trace request may be modified to determine the effect on its execution. For instance, where processing is regulated according to machine state (as with a stateful reference monitor), it may be useful to swap the record's place in the overall sequence with another so that its execution occurs under a different state. In still another example, an automated process may audit the trace and corresponding system environment data to determine whether the environment is suitably equipped to execute the trace, and if not, may modify either the trace or the environment to ensure successful execution. For instance, an audit may reveal that an environmental data does not include a particular data object that the trace seeks to access, so the environmental data is amended to include that object. In still another example, an automated process may be employed to explore alternative execution scenarios by "killing" a process (thereby causing its progeny to be ignored), to determine the impact on subsequent requests. For instance, where the execution of requests is regulated according to changes in state, killing a particular process may allow subsequent requests to execute under a different state than originally existed, thereby potentially altering their execution and the result. In still another example, an automated process may examine a trace to determine whether it includes certain types of requests and/or sequences of requests, and if it does not, modify the trace to ensure appropriate request "coverage." Such modification may ensure that access to each of a predetermined group of system resources is requested by at least one trace record.

Stimulus generator 150 may provide a trace comprising only "correct" system activity (i.e., activity which will not cause a system error or malfunction) to simulator 110, but the invention is not limited in this regard. For example, stimulus generator 150 may instead provide a trace which includes only incorrect activity, or a combination of correct and incorrect activity. In some instances, providing a trace which includes only correct activity may be advantageous, since incorrect activity may cause undesirable system functions which, although useful for analyzing the system's reaction to the immediate stimulus, may inhibit or influence subsequent system functions. For example, a trace which includes activity such as a virus may cause the system to react by denying requests to access resources that would otherwise be deemed innocuous. As a result, a simulation using incorrect trace simulated past the point of the initial infraction and denial may cause a misleading or otherwise ineffective evaluation of a security policy. Providing a trace with incorrect activity is very valuable to ensure that a security policy (which may be modified over time), successfully blocks the incorrect behavior. A trace provided by stimulus generator 150 may be captured by simply observing requests to access system resources (i.e., allowing all requests to access system resources to pass be performed), or by restricting requests. Where a trace is generated by observing resource requests, the trace may also include an indication of the original system's response to the request. In this manner, the original system's response may be compared to the simulator's response to the same request. Where the security policy enforced is different than the policy implemented by the system, this comparison may provide useful information on the effect(s) of certain policy on system behavior.

A trace provided by stimulus generator 150 may comprise activity observed by a reference monitor which is the same as (or substantially similar to) the reference monitor being simulated, although the invention is not limited in this regard. In some instances, it may be advantageous for the trace to have been captured by a reference monitor similar to the one being simulated, because the trace will include the same types of requests that the reference monitor being simulated regulates, and thus yield an effective evaluation of security policy. In addition, the security policy which is ultimately created as a result of the evaluation process will be designed for effective implementation by the reference monitor from which the trace was taken.

In the embodiment depicted, the trace provided by stimulus generator 150 reflects information provided by state log generator 140 defining system state and/or providing information about the system to be simulated. State log generator 140 provides this information to system environment 114 in signal 145. For example, portions of the registry, such as the CLASSES_ROUTE section, may be employed to modify trace data.

In another example, information on network interfaces, such as IP addresses, may be used. Other examples may include indications of system state or parameters. Such data may be employed by simulated system environment 114 to recreate the environment for kernel process 112, and provide the data needed by simulated system environment 114 to respond to queries issued by kernel process 112. The invention is not limited, however, to providing and/or utilizing this data, as other techniques for recreating (or fabricating) a system environment may be employed.

As discussed above, data provided by state log generator 140 may provide an indication of the time at which it was ascertained. In one embodiment, the data provided by state log generator 140 comprises time-stamped data defining the system environment that was captured in response to processing trace requests. This data allows simulated system environment 114 to assist kernel process 112 in processing a request as it was originally, by correlating the request processed by kernel process 112 to the system environment as it existed at the time of original execution. In this manner, as discussed above, simulator 110 need not allow the same period to lapse between requests, and instead can process trace requests on an event-driven basis. The simulator can be used for stress-testing of the Management Console, as the simulator can provide thousands of instances concurrently. This setup benefits from scaling the intervals between request execution from zero, to real-time, to several times slower than real-time.

In one embodiment, the trace supplied by stimulus generator 150 to simulator 110 is in the form of a file which provides a catalogue of all requests observed and/or processed, such as a log file which assigns a sequence number to each request. In this manner, stimulus generator 150 may examine the file to ensure that all sequence numbers are present, ordered correctly and appear without gaps. However, the invention is not limited in this regard, as other techniques for validating the completeness and/or accuracy of the trace may alternatively be employed.

It should be appreciated that the provision and/or modification of trace data by stimulus generator 150 is not limited to the techniques discussed above, as numerous techniques for providing and/or modifying trace data may be employed. It should further be appreciated that stimulus generator 150 may provide any of the above-discussed data to simulator 110 via a propagated signal, and that simulator 110 may execute on the same machine as stimulus generator 150, or on a different machine.

Rule compiler 130 provides simulator 110 with security rules in signal 135. To form the security rules, rule compiler 130 receives input from global event manager 120 in the form of a security policy. The policy may be the actual policy implemented on the system to be simulated, may comprise a default security policy, may be some combination of the two, or may comprise another set of data altogether. It should be appreciated, then, that the manipulation performed by rule compiler 130 on input provided by global event manager 120 may vary widely depending on the security rules to be simulated.

The rules supplied to simulator 110 by rule compiler 130 may be provided in the form of programmed instructions. Though the invention is not limited in this regard, in one embodiment, rule compiler 130 updates a library which stores the programmed instructions and simulator 110 accesses the library in the course of operation. Such a library may allow other applications to access the security rules as well. For instance, a management console (such as the aforementioned StormWatch management console) may access the rules and/or rule compiler 130 to examine, supplement and modify the rules and/or the manner in which they are compiled. For example, rules may be modified to change accessible and/or inaccessible resources, actions that are permitted and/or not permitted of an application or group of applications, or other rules. Rules may also be modified to ascertain the simulator's reaction to a trace request in the absence or present of certain rules. Security rules may be defined, modified and/or supplemented by manual user input, automated process or combination of the two.

Evaluation module 170 determines the effectiveness of the security rules as implemented by simulator 110. In one embodiment, evaluation module 170 comprises a series of programmed instructions which, when executed, produces one or more qualitative and/or quantitative measures of the success of the rules in preventing undesirable activity and allowing desirable activity to occur. In the embodiment depicted, evaluation module 170 receives input from simulator 110 in the form of a log file generated during the execution of trace requests. Evaluation module 170 may employ this data to produce quantitative analyses such as the number of times each resource was requested, number of queries issued to a user, number of queries denied, rate of improper requests denied, and rate of proper requests allowed. Also, evaluation module 170 may produce qualitative analyses such as the security rules executed and/or not executed during the simulation, and types of trace requests that were improperly allowed and prevented.

In one embodiment, evaluation module 170 provides such quantitative and qualitative analyses after testing completes. However, the invention is not limited in this regard, as analysis may be provided as testing occurs. For example, a user may examine one or more analyses so that she can adjust trace data and/or security rules accordingly "on the fly" and view the results.

It should be appreciated that any of signals 125, 132, 135, 145, 155 or 175 may be transmitted using any industry-standard communication protocols and/or tools, as the invention is not limited to a particular implementation. For example, signal 135 may be transmitted over a LAN using the Ethernet Protocol, over the Internet using TCP/IP, or using any of numerous other techniques and components. In this respect, it should further be appreciated that simulator components 110, 120, 130, 140, 150, 160 or 170 may execute on the same computer, may each execute on a different computer, or a variation thereof. For example, components 140, 150 and 160 may execute on one computer while all other components execute on another computer. In another example, all components may execute on separate computers.

Figure 2:
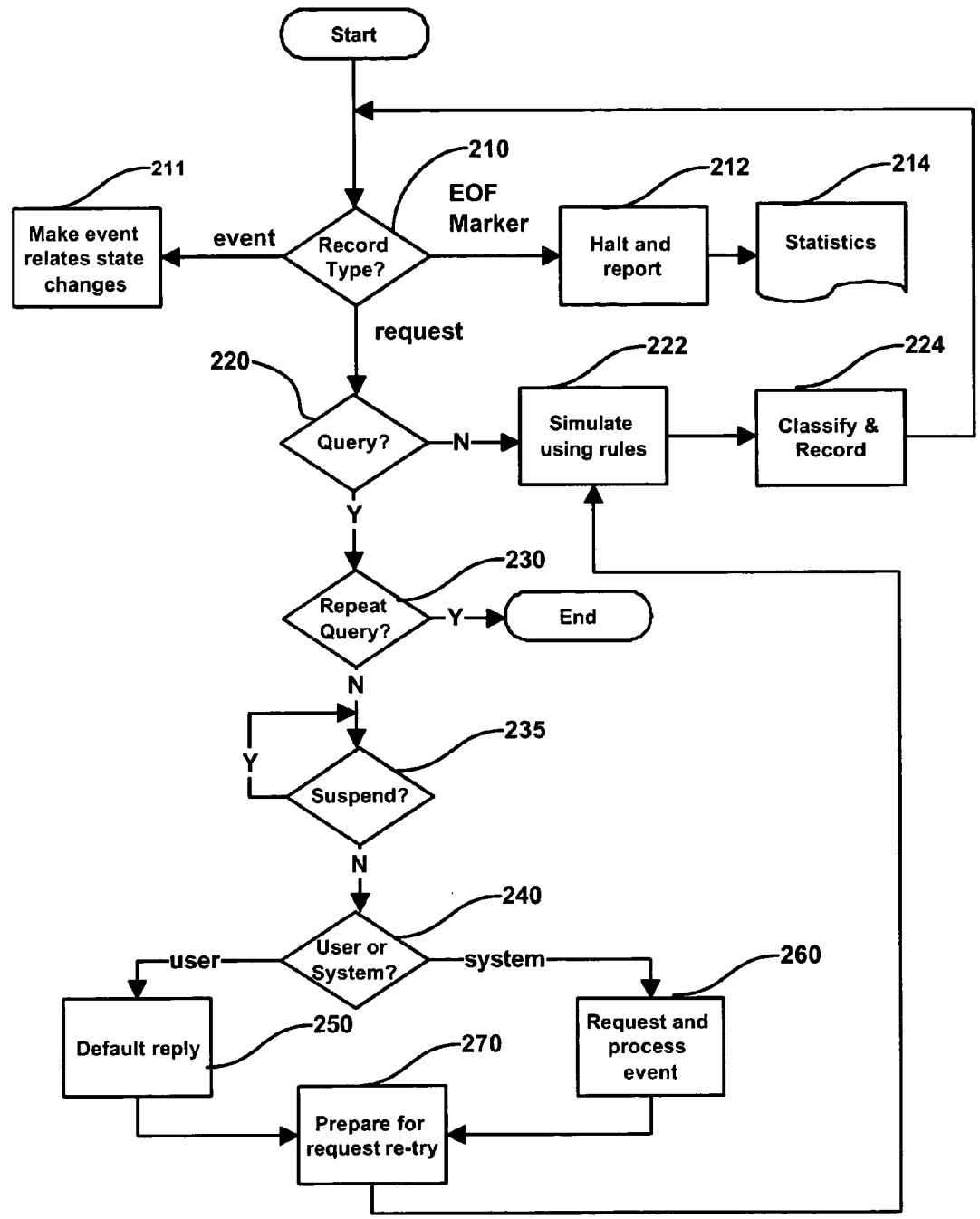
FIG. 2 illustrates an embodiment of a process used to process trace data.

FIG. 2 depicts an exemplary embodiment of a process used to process trace data. The process begins at act 210, wherein the process determines whether an input record is an event (i.e., as discussed above, provided by global event manager 120 in response to a query), a request or an end of file marker. If it is determined in step 210 that the input record is an event, the process proceeds to step 211, wherein system environment 114 (FIG. 1) is updated per instructions provided within the event. An event may initiate the update of the system environment in any of numerous ways. For example, an event may initiate an update to the registry, or may provide information needed to execute a specific process. After the completion of act 211, the process terminates.

If it is determined in act 210 that the input record is an end of file marker, the process proceeds to act 212, wherein the process terminates, issues an indication that it has terminated, and proceeds to step 214. At step 214, the process produces statistics on the effectiveness of the security policy, as discussed in greater detail below.

If it is determined in act 210 that the input record is a request, the process proceeds to act 220 wherein it determines whether the request requires a query. If the processed determines in act 220 that the request does not require a query (i.e., that it can execute the request based on information stored in simulator 110), the process proceeds to act 222, wherein it simulates request execution by applying rules maintained in the rules engine as discussed above.

At the completion of act 222, the process proceeds to act 224 wherein the execution of the request is classified and recorded. As discussed above, classification and recording may entail writing the request and its result to a log file for subsequent analysis. At the completion of act 224, the process returns to the start so that a new input record may be processed.

If the process determines in act 220 that the request requires a query (i.e., that it can not be processed without further updates to simulator 110), the process proceeds to act 230, wherein it determines whether the query is a repeat query. To make this determination, the process may maintain an inventory of previously issued queries in any of numerous ways, as the invention is not limited to a particular implementation. The process determines whether a query is a repeat query in order to avoid redundant processing. Specifically, each time the process initiates a query, it causes an update (e.g., to system environment 114) to enable it to process the request. The update occurs as a result of processing an event received from global event manager 120. Thus, if the process determines that a query is a repeat query, the process concludes that it was unable to perform an update previously to process the request. Accordingly, if the process determines at act 230 that the query is a repeat query, the process terminates. In one embodiment, it may also issue a report indicating that it abnormally terminated.

If the process determines in act 230 that the request is not a repeat query, the process proceeds to act 235 wherein a determination is made regarding whether to suspend processing or continue processing. If the decision is to suspend processing, then act 235 is continuously executed until processing is resumed.

When processing resumes act 240 is executed wherein it determines whether the query is user-based (e.g., whether it requires user input in response) or system-based. The simulation of a user-based query requires that interaction between a user and system be simulated, while a system-based query requires a lookup into data structures maintained by system environment 114.

If the process determines in act 240 that the query is user-based, the process proceeds to act 250 wherein it prepares and delivers a simulated reply to the request. The simulated reply may comprise any form of input usually provided by a user (e.g., the choice of an answer displayed in a dialogue box), and the invention is not limited in this regard. The process may be configurable to provide any of numerous responses to user-based queries.

If the process determines in act 240 that the query is a system-based query, the process proceeds to act 260, wherein it performs a lookup on one or more data objects maintained by system environment 114 to ascertain the current environment, and requests an update to system environment 114 so that the request can be processed. In one embodiment, the process sends a request to global event manager 120, and global event manager 120 sends an event in response. The event is then processed as discussed above with reference to act 211 to update system environment 114.

Upon the completion of either act 250 or act 260, the process proceeds to act 270 wherein it prepares to attempt to re-process the request. The process then proceeds to act 222, wherein the process executes the request by applying rules maintained in the rules engine. As discussed above, the process then proceeds to act 224, wherein request execution is classified and recorded. The process then returns to the start so that a new input record may be processed.

Figure 3:
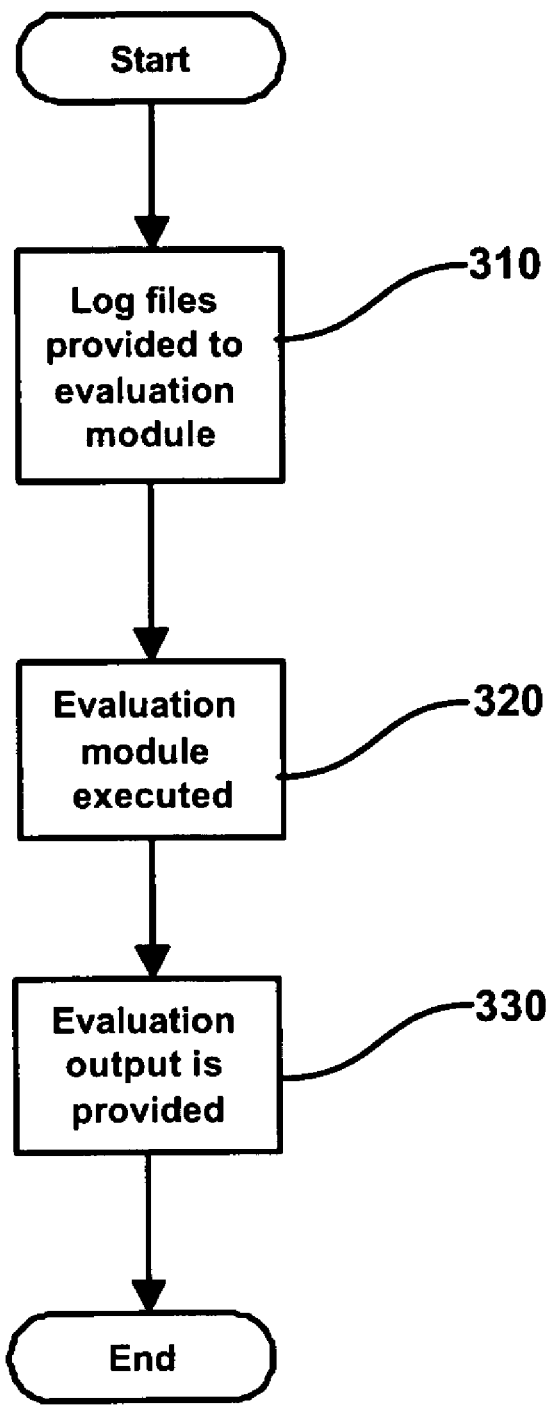
FIG. 3 illustrates an embodiment of a process used to evaluate security rules implemented by a simulator.

FIG. 3 depicts an exemplary process used to evaluate the security rules implemented by simulator 110 to process trace requests. In act 310, data describing the simulator's execution of, and response to, requests is provided to evaluation module 170. Data may be provided to evaluation module 170 during the simulator's execution of trace data, or after execution of trace data completes. In one embodiment, data is provided in the form of one or more log files. In one embodiment, security rules may also be provided to evaluation module 170.

Upon the completion of act 310, the process proceeds to act 320, wherein evaluation module 170 evaluates the security rules implemented by the simulator. The evaluation may comprise quantitative analysis, qualitative analysis or a combination thereof. As discussed above, quantitative analyses may include the number of times a resource was requested, number of queries issued to a user, number of queries denied, rate of improper requests denied, and rate of proper requests allowed. Qualitative analyses may include the security rules executed and/or not executed during the simulation, and the types of trace requests that were "improperly" allowed and prevented (as defined by predetermined criteria). However, the invention is not limited to the analyses listed. For example, in one embodiment, evaluation module 170 may be employed to produce customized analysis.

Upon the completion of act 320, the process proceeds to act 330, wherein evaluation output is provided. In one embodiment, this output is delivered to a user via a conventional monitor display. However, the invention is not limited in this regard, as output may be provided in any desired form. For example, output from evaluation module 170 may comprise a data file which may serve as input to a subsequent automated process, such as a management console which aggregates the results of evaluating multiple sets of security rules. Upon the completion of act 330, the process terminates.

Figure 4:
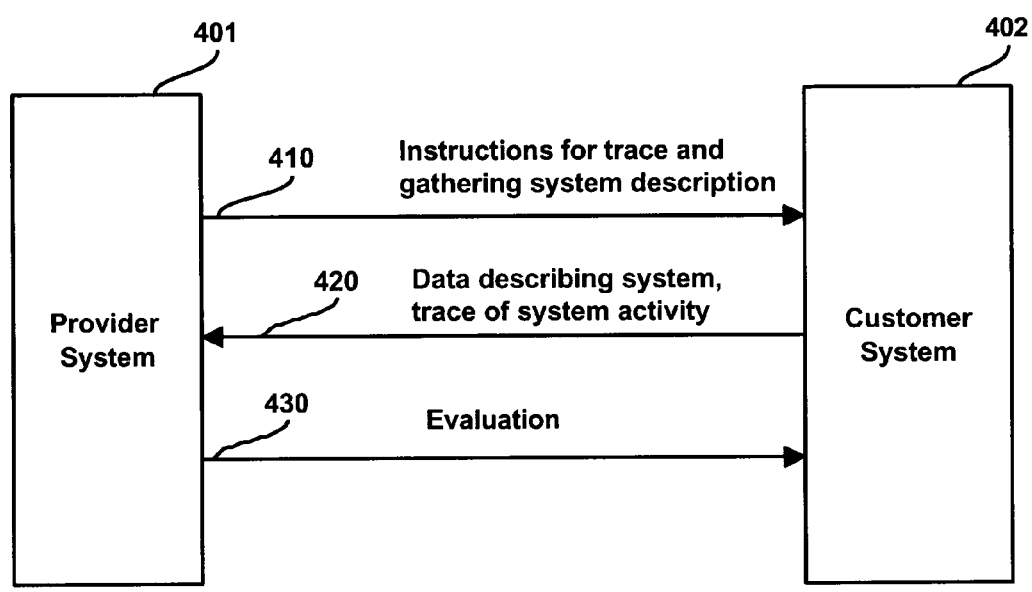
FIG. 4 depicts a transmission of propagated signals between a provider and a customer to facilitate the simulation of a reference monitor according to one embodiment.

FIG. 4 depicts the transmission of propagated signals between a provider 401 and a customer 402 to facilitate the simulation of a reference monitor according to one embodiment of the invention. Such propagated signals may be sent according to any conventional communication medium, such as the Internet.

In the depicted embodiment, provider system 401 transmits instructions to customer system 402 in signal 410. In one embodiment, these instructions include program code designed for execution on customer system 402 that, when executed, produce a data structure describing customer system 402, and a trace of activity thereon. In one embodiment, the data structure is designed to serve as the foundation of system environment 114 (FIG. 1) and thus comprises descriptions of such components on customer system 402 as the registry, network connections, and reference monitor. The system activity trace, as discussed above with reference to FIG. 1, may be gathered by one or more reference monitors executing on customer system 402, and may include "correct" system activity, incorrect activity, or a combination thereof.

In the depicted embodiment, customer system 402 transmits the data structure and the trace to provider system 401 in signal 420. The transmission in signal 420 may be performed as a batch process or, if instructions sent by provider system 401 in signal 410 are transmitted during an online process with customer system 402, may be performed contemporaneously with the transmission in signal 410.

In the depicted embodiment, provider system 401 executes a simulation of a reference monitor (as discussed above with reference to FIGS. 1 and 2) executing on customer system 402, utilizing security rules which either approximate the security policy implemented on customer system 402, or constitute another set of rules (which may be set forth by provider system 401). Provider system 401 also produces an evaluation of these security rules implemented in the simulation (also as discussed above), and transmits this evaluation to customer system in signal 430. This evaluation may prove useful in refining the security policy implemented on customer system 402.

It should be appreciated that facilitating the simulation of a reference monitor via propagated signal may be accomplished in any of numerous ways, as the invention is not limited to a particular implementation. For example, provider system 401 may provide data and instructions sufficient to execute the simulation on customer system 402, or provider system 401 and customer system 402 may share the required processing. It should also be appreciated that the data sent between provider system 401 and customer system 402 need not travel over the same communications medium or utilize the same protocols. For example, provider system 401 may transmit instructions in signal 410 to customer system 402 via dialup connection and FTP, receive data in signal 420 via the internet using TCP/IP, and transmit an evaluation in signal 430 via a wireless connection using WAP.

The above-described embodiments of the present invention can be implemented in any of numerous ways. For example, the above-discussed functionality can be implemented using hardware, software or a combination thereof. When implemented in software, the software code can be executed on any suitable processor or collection of processors, whether provided in a single computer or distributed among multiple computers. In this respect, it should be appreciated that the above-discussed functions can be distributed among multiple processes and/or systems. It should further be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A computer-implemented method of operating a reference monitor simulator to recreate operations performed by a reference monitor on a computer system, the method comprising:
    defining at least one security rule specifying whether to allow a request to access at least one resource;
    supplying at least one request to access a resource;
    applying the at least one security rule in response to the at least one request to access the resource to determine whether to allow the at least one request and to control whether access is granted to the resource; and
    controlling the reference monitor simulator to operate at an accelerated rate as compared to an actual reference monitor by providing at least one parameter that defines a system environment in which the reference monitor simulator executes,
    where the at least one parameter includes a time parameter that controls one or more of, eliminating a time gap between trace requests, indicating that a time period between portions of a trace request has elapsed, and running a system clock faster than real-time,
    where the method being run, at least in part, as an event-driven kernel process.

2. The method of claim 1, comprising:
    assessing the effectiveness of the at least one security rule.

3. The method of claim 2, wherein assessing the effectiveness of the security rule comprises determining at least one of, the number of improper access requests prevented, and the number of proper access requests allowed.

4. The method of claim 2, wherein assessing the effectiveness of the security rule comprises determining a rate of improper requests prevented.

5. The method of claim 1, where providing at least one request to access the resource comprises an application program supplying the at least one request to access the resource.

6. The method of claim 1, where supplying at least one request to access the resource comprises capturing at least one request to access the resource before supplying the at least one request to access the resource.

7. The method of claim 6, where the actual reference monitor performs the capture of the at least one request to access the resource.

8. The method of claim 7, where the actual reference monitor that performs the capture of the at least one request to access the resource is the same type of reference monitor as the reference monitor whose operations are recreated by the reference monitor simulator.

9. The method of claim 6, where the captured at least one request to access the resource is an improper request.

10. The method of claim 9, wherein an improper request comprises a request issued by an application in response to one of, a virus, and a buffer overrun attack.

11. The method of claim 6, where the captured at least one request is modified prior to supplying the at least one request to access the resource.

12. The method of claim 11, where the modification is performed by a user.

13. The method of claim 2, where an electronic file system stores the at least one security rule, and
    where assessing the effectiveness of the at least one security rule comprises the reference monitor simulator accessing the security rule in the electronic file system in response to receiving the at least one request to access the resource.

14. The method of claim 1, where the at least one parameter provided to the reference monitor simulator comprises at least one of a system clock, a wrapper function, and a timer event.

15. The method of claim 1, comprising:
    maintaining statistics on the operation of the reference monitor simulator.

16. The method of claim 15, where the statistics include at least one of, the number of requests per resource, number of total requests, type of request per resource, total of each type of request, number of queries, number of callbacks, number of requests allowed compared to number of requests expected, and number of requests prevented compared to number of prevented requests expected.

17. A system for providing a reference monitor simulator for simulating the operations performed by a reference monitor, the system comprising:
    one or more processors;
    a definer component to define at least one security rule specifying whether to allow or deny a request to access at least one resource under a given set of circumstances, where the definer component is implemented in computer hardware;

a supplier component to supply at least one request to access a resource, where the supplier component is implemented in computer hardware; and an applier component to apply the at least one security rule in response to the at least one request to access the resource to determine whether to allow or prevent the at least one request, where the applier component is implemented in computer hardware;

and a control component to control the reference monitor simulator to operate at an accelerated rate as compared to an actual reference monitor by providing at least one parameter that defines a system environment in which the reference monitor simulator executes, where the control component is implemented in computer hardware, where the at least one parameter includes a time parameter, where the time parameter that controls one or more of, eliminating a time gap between trace requests, indicating that a time period between portions of a trace request has elapsed, and running a system clock faster than real-time, where the applier component and control component operate, at least in part, at the kernel level, and where the system is event-driven.

18. The system of claim 17, comprising an assessor component to assess the effectiveness of the at least one security rule.

19. The system of claim 18, where assessing the effectiveness of the security rule comprises determining at least one of, the number of improper access requests prevented, and the number of proper access requests allowed.

20. The system of claim 18, where assessing the effectiveness of the security rule comprises determining a rate of improper requests prevented.

21. The system of claim 17, comprising an application program to supply the supplier component with the at least one request to access a resource.

22. The system of claim 17, comprising a capture component to capture at least one request to access a resource before supplying the at least one request to access the resource.

23. The system of claim 22, where the capture component includes a second reference monitor.

24. The system of claim 23, where the second reference monitor is a same type of reference monitor as the reference monitor whose operations are recreated by the reference monitor simulator.

25. The system of claim 22, where the capture component captures at least one improper request to access the resource.

26. The system of claim 25, where an improper request comprises a request issued by an application in response to one of, a virus, and a buffer overrun attack.

27. The system of claim 22, comprising a modification component to modify at least one captured request prior to supplying the at least one request to access the resource.

28. The system of claim 27, where the modification component takes input from a user.

29. The system of claim 17, comprising an electronic file system that stores the at least one security rule, and where the applier component accesses the security rule in the electronic file system in response to receiving at least one request to access the resource.

30. The system of claim 17, where the provider component provides at least one parameter to the reference monitor simulator which includes at least one of a system clock, a wrapper function, and a timer event.

31. The system of claim 17, comprising:
a statistics component to maintain statistics on the operation of the reference monitor simulator.

32. The system of claim 31, where the statistics component maintains statistics that include at least one of, the number of requests per resource, number of total requests, type of request per resource, total of each type of request, number of queries, number of callbacks, number of requests allowed compared to number of requests expected, and number of requests prevented compared to number of prevented requests expected.

33. A computer-readable medium encoded with computer instructions, which when executed on a processor, perform a method of operating a reference monitor simulator to recreate operations performed by a reference monitor on a computer system, the method comprising:

defining at least one security rule specifying whether to allow a request to access at least one resource;

supplying at least one request to access a resource;

applying the at least one security rule in response to the at least one request to access the resource to determine whether to allow the at least one request and to control whether access is granted to the resource; and controlling the reference monitor simulator to operate at an accelerated rate as compared to an actual reference monitor by providing at least one parameter that defines a system environment in which the reference monitor simulator executes, wherein the at least one parameter includes a time parameter that controls one or more of, eliminating a time gap between trace requests, indicating that a time period between portions of a trace request has elapsed, and running a system clock faster than real-time, wherein the method being run, at least in part, as an event-driven kernel process.

34. The computer-readable medium of claim 33, further comprising instructions, which when executed on the processor, perform:

assessing the effectiveness of the at least one security rule.

35. The computer-readable medium of claim 34, wherein assessing the effectiveness of the security rule comprises determining at least one of, the number of improper access requests prevented, and the number of proper access requests allowed.

36. The computer-readable medium of claim 34, wherein assessing the effectiveness of the security rule comprises determining a rate of improper requests prevented.

37. The computer-readable medium of claim 33, wherein providing at least one request to access the resource comprises an application program supplying the at least one request to access the resource.

38. The computer-readable medium of claim 33, wherein supplying at least one request to access the resource comprises capturing at least one request to access the resource before supplying the at least one request to access the resource.

39. The computer-readable medium of claim 38, wherein the actual reference monitor performs the capture of the at least one request to access the resource.

40. The computer-readable medium of claim 39, wherein the actual reference monitor that performs the capture of the at least one request to access the resource is the same type of reference monitor as the reference monitor whose operations are recreated by the reference monitor simulator.

41. The computer-readable medium of claim 38, wherein the captured at least one request to access the resource is an improper request.

42. The computer-readable medium of claim 38, wherein an improper request comprises a request issued by an application in response to one of a virus, and a buffer overrun attack.

43. The computer-readable medium of claim 38, wherein the captured at least one request is modified prior to supplying the at least one request to access the resource.

44. The computer-readable medium of claim 43, wherein the modification is performed by a user.

45. The computer-readable medium of claim 34, wherein an electronic file system stores the at least one security rule, and wherein assessing the effectiveness of the at least one security rule comprises the reference monitor simulator accessing the security rule in the electronic file system in response to receiving the at least one request to access the resource.

46. The computer-readable medium of claim 33, wherein the at least one parameter provided to the reference monitor simulator comprises at least one of a system clock, a wrapper function, and a timer event.

47. The computer-readable medium of claim 38, further comprising instructions, which when executed on the processor, perform:

maintaining statistics on the operation of the reference monitor simulator.

48. The computer-readable medium of claim 47, wherein the statistics include at least one of: the number of requests per resource, number of total requests, type of request per resource, total of each type of request, number of queries, number of callbacks, number of requests allowed compared to number of requests expected, and number of requests prevented compared to number of prevented requests expected.

* * * * *